Figure 4:
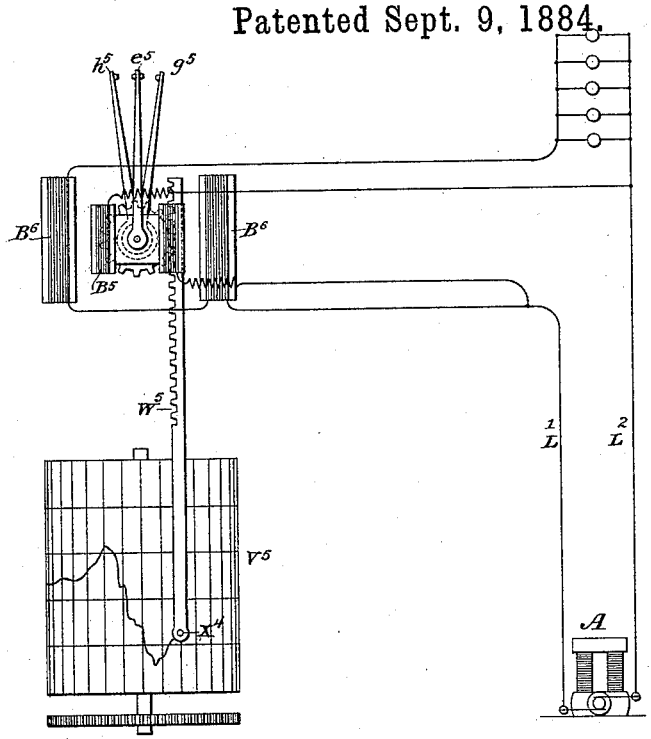

(No Model.) 3 Sheets—Sheet 1.
C. L. CLARKE.
ELECTRICAL METER.
No. 304,907. Patented Sept. 9, 1884.
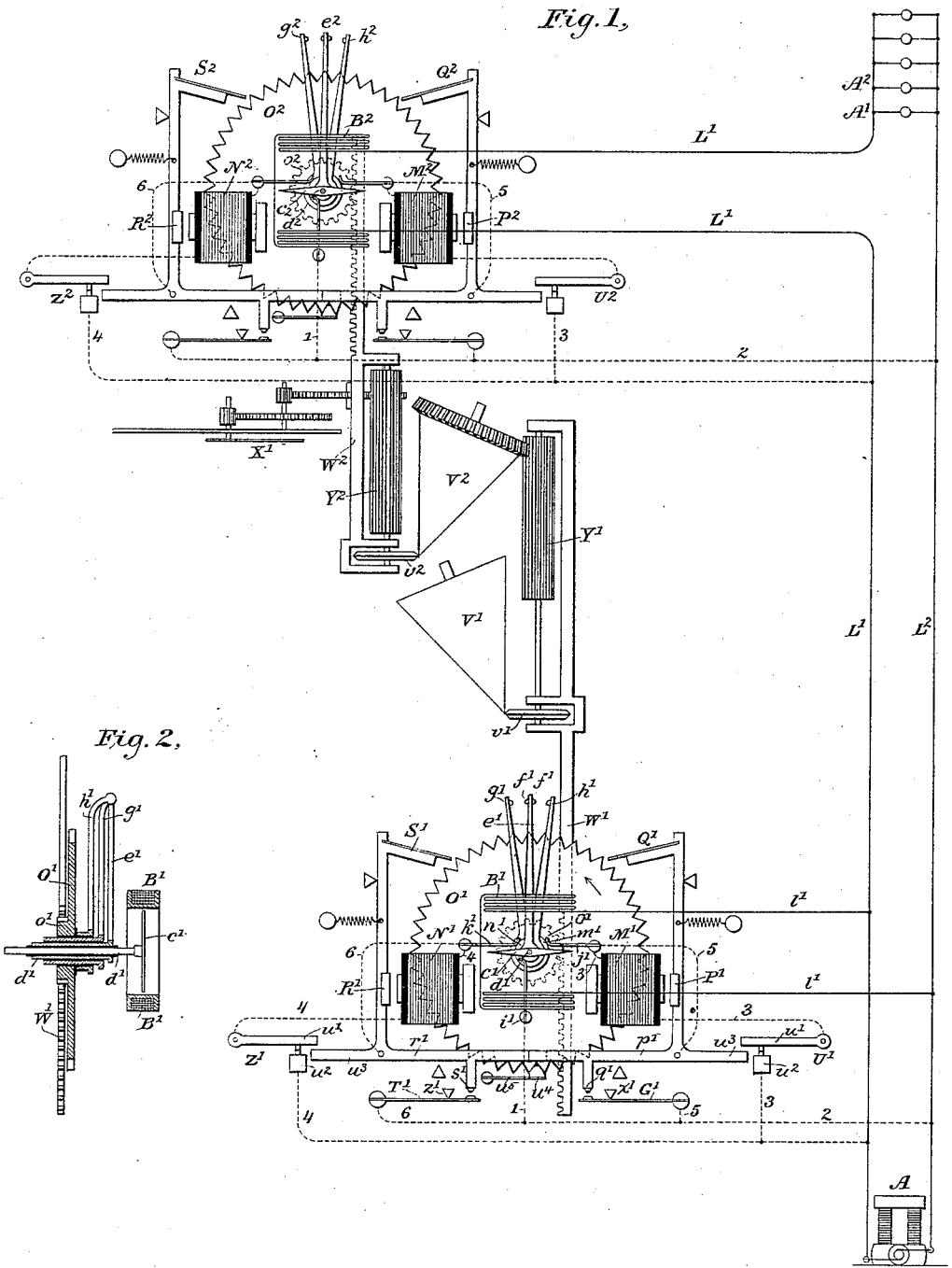
WITNESSES
Wm A. Skinkle
Carrie E. Ashley
INVENTOR
Charles L. Clarke,
By his Attorneys
Pope Edgecomb & Butler (No Model.)  3 Sheets—Sheet 2.
C. L. CLARKE.
ELECTRICAL METER.
No. 304,907. Patented Sept. 9, 1884.
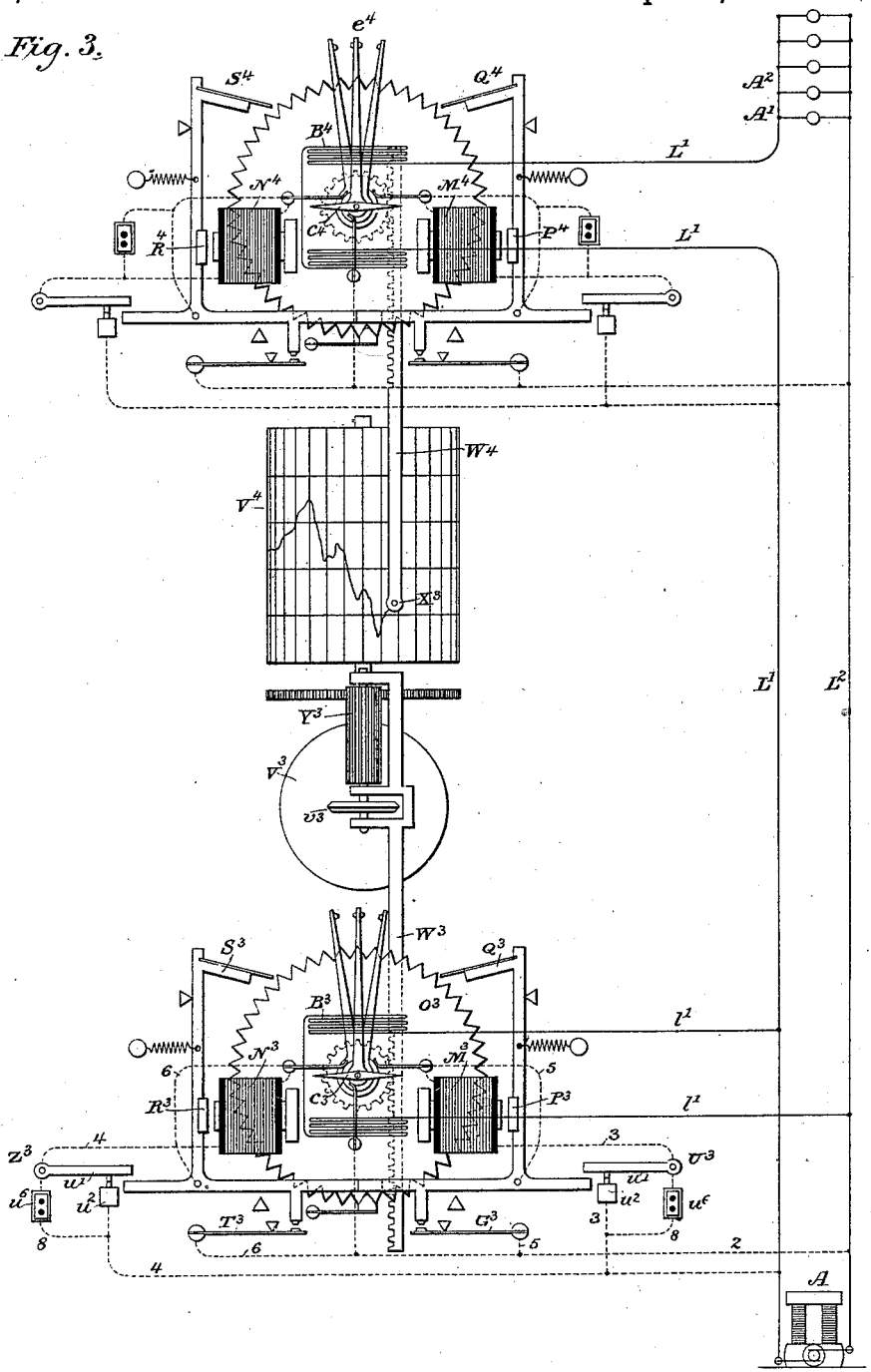
WITNESSES
Wm A. Skinkle
Carrie E. Ashley
INVENTOR
Charles L. Clarke
By his Attorneys
Pope Edgecomb & Butler (No Model.) 3 Sheets—Sheet 3.

C. L. CLARKE.
ELECTRICAL METER.

No. 304,907. Patented Sept. 9, 1884.

WITNESSES
Wm A. Skinkle
Carrie E. Ashley

INVENTOR
Charles L. Clarke,
By his Attorneys
Pope Edgecomb & Ratley

UNITED STATES PATENT OFFICE.

CHARLES L. CLARKE, OF NEW YORK, N. Y., ASSIGNOR TO THE TELEMETER COMPANY, OF SUMMIT, NEW JERSEY.

ELECTRICAL METER.

SPECIFICATION forming part of Letters Patent No. 304,907, dated September 9, 1884.

Application filed December 26, 1883. (No model.)

*To all whom it may concern:*

Be it known that I, CHARLES L. CLARKE, a citizen of the United States, and a resident of the city, county, and State of New York, have invented certain new and useful Improvements in Electric Meters, of which the following is a specification.

My invention relates to the class of apparatus employed for measuring or determining the amount of electrical energy consumed in operating the apparatus included in or connected with an electric circuit.

The object of the invention is to provide a meter of this character which will automatically determine and record either the quantity of electricity which traverses or is consumed in an electric circuit in a given time, the variations of the electro-motive force to which the electric current is due, or the product of these two quantities or factors—that is to say, the total consumption of electrical energy.

It is well known that the electrical energy consumed in a given circuit in a given time is proportional to the product of the current flowing through that circuit multiplied by the fall of potential in the same circuit, or of the electro-motive force to which the current is due. If, therefore, the electro-motive force be constant and known, as is usually the case with the multiple-arc or incandescent system of electric lighting, it would be necessary, for the purpose of determining the amount of electrical energy consumed in a given time, to ascertain and record merely the quantity of current and any variations therein. If, on the other hand, the quantity is known and constant, as it should be in the series or arc system of electric lighting, it would be necessary only to determine and record the variations in the electro-motive force during the given time. If, however, both factors are variable, measurements must be taken of each in order to determine the total consumption of electrical energy. By multiplying these two factors into each other, the result will be the measurement of the electrical energy. My invention aims to automatically accomplish this last-named result, as well as to measure each factor separately, when desired.

The invention consists in constructing apparatus in substantially the following manner: A long-coil or high-resistance galvanometer, electric dynamometer, or other suitable measuring device is so connected with the circuit through which the current is to be transmitted that it will respond to the variations in the intensity of the current supplied to that circuit. A contact-arm is moved in unison with the movements of the galvanometer-needle or other determining portion of the instrument, and is caused by these movements to impinge against one or the other of two contact-arms, which are respectively placed upon the opposite sides of the same. When this circuit-closing arm makes contact with either contact-arm, it completes an independent electric circuit, which may or may not be derived from the primal electric circuit, through the coils of a corresponding electro-magnet which is adapted to advance both contact-arms in the direction of the movement of the circuit-closing arm and through a distance corresponding to the advancement made by the circuit-closing arm. This operation of the electro-magnet automatically causes the independent circuit to be again interrupted, and this portion of the apparatus then remains at rest until, by the movement of the galvanometer-needle or other measuring-instrument, the operation is repeated either in the advance or retrograde direction. The movements of the contact-arms thus obtained are imparted also to the support of a perimeter-wheel which rests upon a revolving cone, disk, or other suitable moving surface. So long as no current passes through the galvanometer the perimeter-wheel stands at the apex of the cone, or at such a point upon or in such relation to the moving surface employed that no motion will be imparted to the wheel. This result may be obtained in any well-known manner, the method adopted at any particular time being dependent upon the form of moving surface adopted. Thus the perimeter-wheel might be caused to stand at the center of a revolving disk, or in a position at right angles to the moving surface of a revolving cylinder, or, as above stated, at the apex of a revolving cone. When, however, the galvanometer or other primal instrument is actuated by a current traversing the main line, the perimeter-wheel is caused, by the movements of the circuit-closing and contact arms, to so change its position relative to the moving surface as to receive therefrom a movement proportional to the change in the electro-motive force which gave rise to the current. Thus, in the case of the cone, it will move along the surface of the same in a direction toward the base, and in the case of the revolving disk it will move along the same radially from the center of revolution, the change of position of the perimeter-wheel being through a distance proportional to the movements of the circuit-closing and contact arms, and thus proportional to the electrical pressure or the intensity of the current. The perimeter-wheel will therefore be revolved with a rapidity dependent upon the intensity of the current. The movements of the perimeter-wheel are in turn imparted to a second cone or to a device similar to that employed in connection with the first-named measuring-instrument. The second moving surface will therefore, it is evident, be revolved at a rate dependent upon the position occupied by the first perimeter-wheel with reference to its moving surface—that is to say, upon the intensity of the current which is to be measured. Upon the surface of this second cone, disk, or other moving surface rests a second perimeter-wheel, which is moved toward and away from the base of the cone, or the position of which is modified with reference to the moving surface in a manner and by means of a device precisely similar to that employed for controlling the position of the first perimeter-wheel, with the exception, however, that the position of the second perimeter-wheel depends upon the quantity of current traversing the main line, rather than upon the intensity of the same. For this purpose a short-coil or low-resistance galvanometer or equivalent device is connected in the main circuit or in a shunt of the same, in place of the long-coil or high-resistance galvanometer described in connection with the first-named device. The ultimate rate of revolution of the second perimeter-wheel will therefore depend, it is evident, upon the two factors—namely, the electro-motive force and the quantity of the current on and in the circuit. It is necessary, therefore, only to record the revolutions of the last-named wheel in order to determine the entire consumption of electrical energy. This may be done in any convenient manner.

The invention also includes certain details of construction, which will hereinafter be described.

Figure 5:
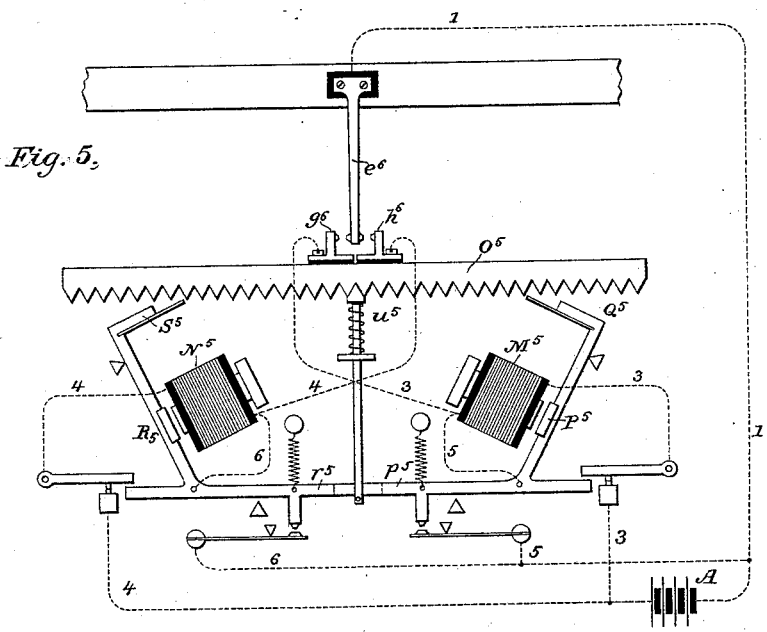

In the accompanying drawings, Figure 1 is a view partially in diagram, illustrating an apparatus embodying my invention. Fig. 2 illustrates certain details in the construction of the same. Figs. 3, 4, and 5 illustrate certain modifications in the organization of the apparatus.

Referring to the drawings, A represents an electric generator or battery of any suitable description, for supplying electricity, and $L'$ $L^2$ represent an electric circuit, proceeding from the generator A, and including any desired number of electric lamps or other electrical apparatus. (Indicated at $A'$, $A^2$, &c.)

Connected with the conductors $L'$ and $L^2$, respectively, at any convenient point in their lengths, is a conductor, $l'$, leading through the coils of a galvanometer, $B'$. The galvanometer is constructed in any suitable manner adapted to measure or indicate the amount of the electro-motive force to which an electric current is due. The conductor $l'$, in which this galvanometer is included, is preferably constructed to permit but a small fraction of the current traversing the main line to traverse the coils of the galvanometer. A resistance may be employed in the conductor $l'$, or the galvanometer may be itself constructed to offer a sufficiently high resistance. The needle $c'$ of this galvanometer is carried upon an arbor, $d'$, which in turn supports a circuit-closing arm, $e'$. Upon the extremities of the circuit-closing arm $e'$ are carried two contact-points, $f'$ $f'$, respectively designed to be caused, by the movements of the arm, to impinge against corresponding contacts carried upon the extremities of the two contact-arms $g'$ and $h'$. The arms $g'$ and $h'$ extend upon opposite sides of the arm $e'$, and they are both supported upon an independent toothed wheel, $O'$. Against the arbor $d'$ of the galvanometer-needle $c'$ rests a contact-brush, $i'$, which is in electrical connection through a conductor, 1, with one arm of a loop-conductor, 2, (shown in dotted lines,) and leading from the main line $L'$ or $L^2$. Two brushes, $j'$ and $k'$, respectively rest upon two insulated contact-surfaces, $m'$ and $n'$, which are respectively applied to the contact-arms $g'$ and $h'$. The two contact-brushes $j'$ and $k'$ are respectively connected, through conductors 3 and 4, with the remaining arm of the loop-circuit. In these conductors are respectively included two electro-magnets, $M'$ and $N'$, which are designed to actuate a toothed wheel, $O'$, upon which the contact-surfaces $m'$ and $n'$ and the arms $g'$ and $h'$ are supported whenever an electric circuit is closed therethrough. Such an electric circuit is completed whenever the arm $e'$ makes contact with either circuit-closing arm $g'$ or $h'$, and the electro-magnet serves to advance the wheel $O'$ in one direction or the other, accordingly as the circuit is closed through one or the other of the electro-magnets. Thus, if the arm $e'$ moves toward the left hand, making contact with the arm $g'$, the circuit will be completed through the coils of the electro-magnet $M'$, thus causing the armature $P'$ of this magnet to be actuated and a driving-pawl, $Q'$, which is carried upon its lever, to advance the wheel in the direction indicated by the arrow. Such an advancement of the wheel will cause the contact-points to be immediately separated, and the operation will be repeated as often as contact is made between the circuit-closing arm $e'$ and the contact-arm $g'$. When the movement of the circuit-closing arm $e'$ is in the opposite direction, it will, by impinging against the contact-arm $h'$ in precisely the same manner, cause the armature $R'$ of the electro-magnet $N'$ to be actuated and its pawl $S'$ to drive the wheel $O'$ in the opposite direction. For the purpose of preventing the occurrence of any disruptive discharge or spark at the delicate contact-points $f'$, through which the circuit is thus primarily completed, each armature-lever $P'$ and $R'$ is provided with an extension, $p'$ and $r$, respectively, carrying contact-points $q'$ and $s'$. These contact-points are caused by the movements of their respective levers to impinge against flexible contact-springs $G'$ and $T'$, respectively, and to thereby complete a shunt-circuit around the contact-points by means of conductors 5 and 6, which respectively extend from the conductors 3 and 4 to the extensions $p'$ and $r'$ of the armature-levers. By means of these conductors the electric circuit of the conductor 3 or 4 will remain completed when either armature has been actuated, even though the contact-points through which the completion was first made may become separated, and in addition the possibility of an occurrence of an electric discharge across these points will be entirely obviated. The flexible contact-springs $G'$ and $T'$ are respectively provided with resting-stops $x'$ and $z'$, against which they normally press. These stops serve to prevent any vibration of the springs when the contact-points are drawn away therefrom. They may or may not be made adjustable. Instead of the flexible springs $G'$ and $T'$ described, relays similar to those described in my former Patents Nos. 284,382 and 284,572 may be employed when found advantageous. It will be seen, however, that it will become necessary to interrupt this circuit as soon as the armature has performed its functions of impelling the wheel $O'$. This is accomplished by means of a device, $U'$, included in the conductor 3, and a device, $Z'$, included in circuit of the conductor 4. Each device $U'$ and $Z'$ consists of an arm, $u'$, which is preferably horizontally placed, and which is connected with one portion of the corresponding conductor, 3 or 4, and of a resting contact-point, $u^2$, upon which the arm rests. The points $u^2$ are respectively connected with the remaining portions of the conductors 3 and 4. By placing the arms $u'$ in horizontal positions, they will be prevented from accidentally falling or being thrown away from their resting-stops even though the instrument be tilted or in any way displaced. The arms $u'$ extend into proximity to corresponding extensions, $u^3$, carried upon the respective armature-levers. Each extension $u^3$ is caused by the movements of the armature-lever to which it is attached to strike against the corresponding arm, $u'$, and to raise it from its contact-points, thereby interrupting the circuit through the conductor in which the device is included. The armature will thereupon be allowed to return to its normal position away from its electro-magnet, at the same time causing the circuit to be interrupted at the points $q'$ or $s'$ before the arm $u'$ has again completed the corresponding connections of the conductor 3 or 4 through its corresponding contact-point, $u^2$. A retaining-pawl, $u^4$, is applied to the wheel $O'$ for preventing it from accidental displacement. This pawl is normally held against this wheel by the pressure of its flexible support $u^5$. The extensions $p'$ and $r'$ of the armatures $P'$ and $R'$ are respectively designed to force this pawl out of engagement with the wheel $O'$, when either armature is actuated, by simply pressing its face. The parts are so adjusted that the contact will first be made at the point $q'$ or $s'$. The pawl will then be forced out of engagement with the teeth of the wheel $O'$, and the driving-pawl $Q'$ or $S'$ will either simultaneously or immediately thereafter act to move the wheel $O'$ in the proper direction. After this operation has been completed the device $U$ will act to interrupt the circuit-connections and permit the devices to resume their normal position.

The particular construction of driving-pawl which I prefer to employ consists of a flexible spring, which is supported upon a rigid extension of the armature-lever. The extension is adapted to enter the space between the teeth next succeeding those engaged by the flexible arm, and to thus prevent the wheel from advancing more than one tooth at a time. The flexible spring permits the pawl to be drawn away from the wheel after it has been advanced one tooth.

The wheel $O'$ carries a toothed wheel, $o'$, which engages a rack-bar, $W'$, and causes the same to move in one direction or the other, according to the direction of motion of the galvanometer-needle $c'$. Upon the rack-bar $W'$ is carried a perimeter-wheel, $v'$, which rests against the surface of a cone, $V'$. This cone is normally revolved at a determinate rate by any suitable means, mechanical or electrical. The position occupied by the perimeter-wheel $v'$ with reference to the surface of the cone $V'$ is dependent upon the intensity of the current by means of which the galvanometer is actuated. When no current is traversing the circuit, the perimeter-wheel $v'$ stands at the apex of the revolving cone $V'$, and no motion is imparted to it. When, however, any electric current is upon the circuit, the intensity of that current will occasion a proportionate deflection of the galvanometer-needle, and will cause the rack-bar $W'$ to be actuated and the perimeter-wheel $v'$ to be moved toward the base of the cone a proportionate distance. The wheel $v'$ will thereby be caused to rotate at a velocity proportionate to the intensity of the current.

Upon the arbor of the perimeter-wheel $v'$ is constructed a long pinion, $Y'$, which meshes with the teeth formed upon the base of a second cone, $V^2$, which cone is similar to the cone $V'$. The cone $V^2$, however, receives its motion from the pinion $Y'$ and the perimeter-wheel $v'$. It will therefore rotate at a speed proportionate to the intensity of the current traversing the circuit. Against the surface of the cone $V^2$ rests a second perimeter-wheel, $v^2$, which is similar to the wheel $v'$.

Upon the arbor of the second perimeter-wheel, $v^2$, is carried a pinion, $Y^2$, which gears with and communicates its motion to a train of wheels terminating in one or more index-hands, $X'$, which serve to denote in any convenient manner the number of revolutions which have been performed by the perimeter-wheel $v^2$. The support of the second perimeter-wheel is connected with or constitutes a continuation of a rack-bar, $W^2$, similar to the rack-bar $W'$. A toothed wheel, $o^2$, carried upon a driving-wheel, $O^2$, gears with the rack-bar $W^2$, and serves to communicate motion thereto in a manner precisely similar to that described with reference to the corresponding parts, $W'$ and $o'$. The primal actuating-power, however, of the wheel $o^2$ is obtained through a galvanometer, $B^2$, which corresponds to the galvanometer $B'$, but is constructed with a short coil or a low resistance for measuring the quantity instead of the intensity of the electric current traversing the circuit. For this purpose the coils of the galvanometer are connected in the branch $L'$ of the main line, as shown; or they may be included in a shunt-circuit through which a proportionate part of the current traversing the main line will pass.

The reference-letters employed in connection with the apparatus connected with the galvanometer $B^2$ indicate parts similar to those described with reference to the galvanometer $B'$, and indicated by the same reference-letters, the affixed numeral 2, however, being substituted for the prime ($'$.) The operation of the parts is also essentially the same, and need not be herein more particularly described.

It will be understood that the movements of the needle $c^2$ of the galvanometer $B^2$ are proportionate to the quantity of current traversing the main line. The perimeter-wheel $v^2$ will therefore be moved from the apex of the cone toward its base a distance proportionate to the quantity of current traversing the main line, and its ultimate rate of revolution will depend both upon the position which it occupies with reference to the moving surface of the cone and upon the rate of revolution of the cone, and thus ultimately upon the product of the two factors—namely, the amount of the electro-motive force and the quantity of current. The movements of the needle $X'$ will therefore correctly indicate the electrical energy which is consumed in the circuit.

As has already been stated, any suitable moving surface may be substituted for the cone described in connection with Fig. 1, and also any suitable indicating or recording device may be substituted for the indicating-needle $X'$.

It is evident that the two galvanometers may be changed, the one being substituted for the other.

If the intensity of the current is constant, or approximately so, as in multiple-arc systems of electric lighting, it may not be necessary to take note of the same for the purpose of determining the electrical energy consumed, for the latter will then be directly proportional to the quantity of current traversing the conductor. In such case the galvanometer $B'$, with its connected devices, may be dispensed with, and the cone $V^2$ be revolved at a determinate rate of speed, either by clock-work or by an electric motor, or in any other suitable manner. The needle $X'$ will then perform the same functions as in the case where both parts of the instrument are employed. If, on the other hand, the quantity of current is maintained constant, as in serial arc-light systems, and the intensity varies with the number of lamps in circuit, then the galvanometer $B'$ should be substituted, in the organization last spoken of, for the galvanometer $B^2$, the connections being such as described with reference to the galvanometer $B'$—that is to say, the galvanometer should be connected in multiple arc. The variations of intensity will then move the perimeter-wheel toward and from the base of the cone in precisely the same manner as the variations of current would move it under the former conditions. The index $X'$ would then indicate the changes in intensity, which, the quantity of current being constant, would be in direct proportion to the electrical energy.

In Fig. 3 a modification of the apparatus is illustrated, in which the record of the variations is made upon the surface of a revolving cylinder in a manner similar to the well-known forms of chronographs. In this device the construction of the apparatus employed in connection with the galvanometers $B^3$ and $B^4$ is precisely similar to that described in connection with the corresponding parts, $B'$ and $B^2$, in Fig. 1, similar parts being indicated by similar reference-letters, and the index-numerals 3 and 4 substituted for the prime and 2, respectively. Instead, however, of a revolving cone, $V'$, there is shown the revolving disk $V^3$, which may be driven, as before, in any suitable manner, at a constant speed. Against the surface of the disk rests a perimeter-wheel, $v^3$, which is moved, in proportion to the movements of the galvanometer-needle $c^3$, toward and away from the periphery or more rapidly moving part of the disk. When no current traverses the line, the perimeter-wheel is constructed to stand at the center of the disk. When, however, any current traverses the circuit, the perimeter-wheel will be caused to move from the center a distance proportional to the intensity of the current. The pinion $Y^3$ will therefore be revolved at a corresponding speed. The movements of this pinion are imparted to the cylinder $V^4$, upon which the record is to be made. So long as no current traverses the main line the marking-point or recording-pen $X^3$, which is carried at the extremity of the rack-bar $W^4$, will stand in a predetermined plane with reference to the surface of the cylinder. When, however, a current traverses the main line, this point will be carried from its position of rest a distance proportional to the quantity of that current. At the same time the cylinder $V^4$ is rotated in the manner described at a speed proportional to the intensity of the current, and the marking-point will describe a continuous line, as indicated upon the cylinder. The area of the surface thus outlined will be proportional to and may be considered as a measure of the electric energy consumed, since it is dependent upon the two component factors—namely, the quantity of current and the intensity. A cone or other moving surface may be substituted in this organization for the revolving disk $V^3$, and a moving sheet of paper or other suitable substitute may be employed in lieu of the cylinder $V^4$, upon which the record is to be made. Either portion of the instrument may be dispensed with, accordingly as the intensity or the quantity of current is a constant factor.

The organization described with reference to Fig. 3 is also especially applicable to the measurement of forces where but one factor is to be determined. Thus, in connection with steam-gages, barometers, thermometers, and other devices employed for the measurements of forces, the galvanometer $B^4$ might be dispensed with and the circuit-closing arm $e^4$ organized to be moved by such force or instrument. The apparatus connected with the galvanometer $B^3$ should then be dispensed with. The cylinder $V^4$ would then be driven at a constant rate, and the marking-point $X^3$ would record the amount of the variations of the force.

In Fig. 3 a method of applying resistance shunt-circuits to the circuit-closing points is illustrated. Thus, in connection with the devices $U^3$ and $Z^3$, a shunt-circuit, 8, including an artificial resistance, $u^6$, is shown, one terminal of the conductor being connected with the arm $u'$ and the other with the contact-point $u^2$. This circuit will, it is evident, remain completed even when the arm is raised from the contact-point. The resistance offered thereby will, however, be sufficient to cause the current to decrease sufficiently to permit the armature of the corresponding electro-magnet to fall away. The discharge across the contact-points, however, which is liable otherwise to occur, will be prevented, for the reason that a more ready path will be offered to the current causing the same through the resistance-circuit. In connection with the electro-magnets $M^4$ and $N^4$, a similar permanent resistance-shunt is illustrated as being placed around the coils of the magnet. This may be employed for neutralizing the inductive discharge of the magnets.

In Fig. 4 an organization is illustrated in which both galvanometers are applied to the same circuit-closing device in the manner of a dynamometer. In this modification the high-resistance or long-coil galvanometer $B^5$ consists of solenoid-coils which are carried upon and move with the support of the circuit-closing arm $e^5$. The coils of the low-resistance galvanometer $B^6$ are employed as the field for the coils $B^5$. The coils $B^6$ are stationary, and are connected for measuring the quantity of the current in the same manner as in the first organization, while the coils $B^5$ are employed for determining its intensity in the same manner as the galvanometer $B'$, described with reference to Fig. 1. The movements and variations of the coils $B^5$ will therefore depend upon the two factors—namely, the electro-motive force and the quantity of the current traversing the main line. The coils $B^5$, together with the circuit-closing arm $e^5$, may be supported in any suitable manner, preferably, however, on torsion-wires which permit of their rotation in the plane of the coils $B^6$. The movements of the coils $B^5$ are transmitted through the circuit-closing and contact arms to any suitable recording device similar to those already described, and a similar organization of apparatus for controlling the circuit-connections may be applied thereto. In the figure a device for receiving the record similar to that described with reference to Fig. 3 is illustrated. For some purposes this organization is especially desirable, for the reason that no magnetized needles are employed, as in the other forms of galvanometers, and there will therefore be no liability of a change in the measuring efficiency by reason of the fall or accidental increase in the magnetic intensity of the moving part. The current itself furnishes not only the field of force but the force acted upon. It may here be stated, in addition, that in some instances it may be found desirable to substitute for the galvanometer-needles spoken of a needle magnetized by a current of electricity, or a simple solenoid traversed by a constant current of electricity may be employed. In practice, however, the ordinary galvanometer can usually be employed with sufficient accuracy, for, if the magnetism of the needles should change, the rate of revolution of the cones or the motion of the moving surfaces may be modified accordingly; or the change in magnetic intensity may be noted and the index modified to meet the requirements.

In Fig. 5 an organization of apparatus as adapted to a circuit-closing device having a lineal movement, instead of a circular motion, is illustrated. The organization of parts is essentially the same as that described in connection with the other devices; but in place of the wheels O' and O², described with reference to Fig. 1, a rack-bar, O⁵, is substituted, upon which are formed teeth designed to be engaged by pawls Q⁵ and S⁵, which serve to drive the same in one direction or the other at the proper periods and speed for maintaining the contact-arms $g^6$ or $h^6$ in their proper positions relative to the circuit-closing arm $e^6$. The movements of the rack-bar may be recorded in any suitable manner, and these movements will determine the variations and the amount of force which is to be measured.

It is evident that the organizations of the character illustrated in Figs. 1 and 3 may, when desired, be very readily adapted to record or to indicate both the intensity and the quantity of current separately, each galvanometer system being provided with its own appropriate recording or indicating device. This adaptation may be still further carried out by applying to the first perimeter-wheel a device adapted to record or indicate its movements, at the same time retaining the recording device connected with the second perimeter-wheel. This organization would furnish the product of the two factors, and also one of the factors separately. The second factor might then be readily determined.

Although the apparatus is herein described as being complete in itself, yet it will be understood that various features of the improvements in organization are applicable to and may be used in connection with the devices and apparatus employed for indicating at remote points variations in temperature and other forces, as described in my patents before referred to.

I claim as my invention—

1. The combination, substantially as hereinbefore set forth, with an electric generator and the circuit therefor, of two galvanometer-arms, the one of which responds to variations in the intensity of the current traversing said circuit or a portion thereof, and the other to variations in the quantity of the same, two contact-arms respectively applied to said galvanometer-arms, electrically-operated devices serving to move said contact-arms in the direction of movement of the corresponding galvanometer-arm, a contact-surface moving at a determinate speed, a wheel bearing upon said surface and receiving therefrom a degree of rotation dependent upon the position of said wheel, a second contact-surface moving at a speed depending upon the rate of revolution imparted to the said wheel, a second wheel resting upon said second surface and receiving therefrom a degree of rotation dependent both upon its positive relation thereto and upon the speed at which said surface is moved, and means, substantially such as described, for indicating or recording the revolutions of said second wheel and for controlling the positions of each of said wheels with reference to their respective moving-surfaces correlatively with the movements of their respective galvanometers.

2. The combination, substantially as hereinbefore set forth, of a galvanometer-arm responding to the variations in the intensity of an electric current, a galvanometer-arm responding to the variations in the quantity of an electric current, contact-arms respectively applied to said galvanometer-arms, electrically-operated devices acting to move said contact-arms in the direction of movement of the galvanometer-arm to which it is applied, and an indicating or recording device for determining the product of the two factors of the electric current.

3. The apparatus for producing movement by the variations in the intensity of an electric current, consisting of a galvanometer affected by such current, moving contacts at which the galvanometer-arm closes circuit, and electrically-operated devices in circuit from said contacts, for moving said contacts away from said arm to break the circuit, substantially as set forth.

4. The combination, with a galvanometer, of moving contacts, between which the galvanometer-arm plays, electrically-operated devices moving such contact, and an electrical circuit including the galvanometer-arm, the moving contacts, and said electrically-operated devices, substantially as set forth.

5. The combination, with a galvanometer-arm included in an electrical circuit, of another arm following the movement of such galvanometer-arm, and electrically-operated devices moving such second arm, the circuit to said electrically-operated devices being closed by the galvanometer-arm, substantially as set forth.

6. The combination, substantially as hereinbefore set forth, of a galvanometer, a circuit-closing point caused by the changes in an electric current traversing said galvanometer to cause the connections of an electric circuit to be completed, and means, substantially such as described, caused by the completion of such circuit to interrupt the connections established through said circuit-closing point.

7. In an electric meter, a transmitting device consisting of the combination, substantially as hereinbefore set forth, with a movable circuit-closing arm, of an insulated sleeve or axis, upon which said arm is supported, two contact-arms respectively extending upon opposite sides of said circuit-closing arm and supported upon insulated sleeves concentric with the first-named sleeve or axis, and means, substantially such as described, for actuating said circuit-closing and contact arms.

8. In an electric meter, a transmitting device consisting of the combination, substantially as hereinbefore set forth, of three revolving arms, three concentric supports for said arms, three contact-brushes respectively resting upon said supports, and means, substantially such as described, for actuating said arms.

9. The combination, substantially as hereinbefore set forth, in an electric meter, with three insulated revolving arms, of an axis upon which one of said arms is supported, two sleeves concentric with said axis, two contact-brushes respectively resting upon said sleeves, and means, substantially such as described, for actuating said arms.

10. The combination, substantially as hereinbefore set forth, of a revolving circuit-closing arm, two contact-arms respectively extending upon opposite sides thereof, a single-toothed wheel, upon which said contact-arms are supported, two electro-magnets, the one or the other of which is vitalized when said circuit-closing arm is brought into contact with one or the other of said contact-arms, and serving to cause said wheel to be moved in the proper direction to separate the circuit-closing and contact arms.

11. The combination, substantially as hereinbefore set forth, in an electric meter, of an electro-magnet, a circuit-closing device for completing the connections of an electric circuit through the coils of said magnet, a shunt-circuit around said circuit-closing device, which is automatically completed when the armature of said electro-magnet is drawn into its forward position, and a circuit-interrupting device caused by the movements of said armature to interrupt the connections of said circuit after said shunt-circuit has been closed.

12. In an electric meter, the combination, substantially as hereinbefore set forth, with a movable circuit-closing point and two contact-points placed upon opposite sides of the same, of electrically-operated devices for causing a separation of said points, means, substantially such as described, for causing said circuit-closing point to make successive contacts with either of said contact-points, and a registering or indicating device for determining the movements of said circuit-closing point.

13. In an electric meter, the combination, substantially as hereinbefore set forth, with a circuit-closing arm and means, substantially such as described, for causing the same to move in either of two directions and to successively complete the connections of one or the other of two electric circuits according to its direction of motion, of electrically-operated devices for severing such connections, and a device for recording, registering, or indicating the movements of said circuit-closing arm.

14. In an electric meter, the combination, substantially as hereinbefore set forth, with a circuit-controlling device and means, substantially such as described, for causing the same to successively complete one or the other of two electric circuits once for each predetermined increase or decrease in a given force, of a registering, indicating, or recording device, which device is controlled by said circuit-controlling device for registering, indicating, or recording the variations in said force.

15. The combination, substantially as hereinbeforth set forth, in an electric meter, with a movable circuit-controlling arm and two contact-arms located upon opposite sides of said circuit-closing arm, of means, substantially such as described, for impelling said circuit-controlling arm a greater or less distance in one direction or the opposite, electrically-operated devices brought into action a greater or a less number of times, according to the amplitude of the movements of said circuit-controlling arm, whereby said contact-arms are caused to periodically follow the movements of said circuit-closing arms, and means, substantially such as described, for registering or indicating the movements of said contact-arms.

16. The combination, substantially as hereinbefore set forth, in an electric meter, with a circuit-closing arm, two contact-arms applied thereto and constituting the terminals of two electric circuits, and electrical devices for completing and interrupting either of said circuits through the agency of said circuit-closing arm, of a revolving wheel and means, substantially such as described, for causing the rate of revolution of said wheel to be dependent upon the movements of said circuit-closing arm.

17. The combination, substantially as hereinbefore set forth, in an electric meter, with a circuit-closing arm, of two contact-arms placed upon opposite sides of the same, and electrically-operated devices for causing an uninterrupted succession of completions and interruptions of one or the other of two electric circuits, according to the character of the changes occurring in a given force, and means, substantially such as described, for recording or indicating those changes.

18. The combination, substantially as hereinbefore set forth, in an electric meter, with a circuit-closing arm and means, substantially such as described, for causing the same to complete an electric circuit through one or the other of two electro-magnets accordingly as a given force increases or decreases, electrically-operated devices for interrupting the connections of such circuit, and a perimeter-wheel caused to revolve at a speed proportionate to the increase and decrease in said force.

19. The combination, substantially as hereinbefore set forth, in an electric meter, of a circuit-closing arm, means, substantially such as described, for advancing the same in one direction or the other a distance dependent upon a variable force, two contact-arms located upon the respective sides of said circuit-closing arm, two electro-magnets, the circuits including which are respectively completed by the contact of said circuit-closing arm with one or the other of said contact-arms a number of times dependent upon the variations in said force, devices, substantially such as described, respectively actuated by the armatures of said electro-magnets, to interrupt the normal connections of their respective circuit, and a permanently-closed resistance-circuit around the contact-points of each of said devices.

20. The combination, substantially as hereinbefore set forth, in an electric meter, of a circuit-closing arm, two contact-arms located upon opposite sides of said circuit-closing arm, two electro-magnets, devices, substantially such as described, for causing an electric circuit to be completed and interrupted through either one or the other of said electro-magnets a number of times dependent upon the amplitude of the movement of said circuit-closing arm, and a permanent resistance-circuit around the coils of each of said electro-magnets.

21. The combination, substantially as hereinbefore set forth, of a circuit-closing device, an electro-magnet included in an electric circuit the connections of which are completed by the action of said device, an interrupting device included in said circuit, consisting of a horizontal arm or bar resting upon a contact-point through which the circuit-connections are normally completed, and means, substantially such as described, for raising said arm or bar from its contact-point when said circuit has been completed by the first-named device.

22. The combination, substantially as hereinbefore set forth, of a circuit-closing device, an electro-magnet included in an electric circuit the connections of which are completed by the action of said device, an interrupting device included in said circuit, consisting of a horizontal arm resting upon a contact-point through which the circuit-connections are normally completed, means, substantially such as described, for raising said arm from its contact-point when said circuit has been completed by the first-named device, and means, substantially such as described, for causing a separation of the contact-points of the circuit-closing device after it has caused said circuit to be closed.

23. The combination, substantially as hereinbefore set forth, of a circuit-closing device, an electric circuit the connections of which are completed by the action of said device, an electro-magnet, and an interrupting device included in said circuit, a shunt-circuit around the first-named circuit-closing device, which is brought into action when the first-named circuit is completed, and means, substantially such as described, for causing said interrupting device to restore the normal conditions of the circuit after said shunt-circuit has been completed.

24. The combination, substantially as hereinbefore set forth, of an electric circuit, a device for completing the connections of that circuit, an electro-magnet included in said circuit, a device for interrupting the normal connections of said circuit, which device is operated by the forward movement of the armature of said electro-magnet, and a permanent circuit around said device, which contains resistance such as to reduce the strength of current sufficiently to permit said armature to fall away from its electro-magnet when said normal connections have been interrupted.

25. The combination, substantially as hereinbefore set forth, in an electric meter, with a galvanometer-arm, of another pivoted arm, carrying on its free end insulated contacts, between which the galvanometer-arm plays, two electro-magnets located in circuit with such contacts and operating pawl-lever, and a toothed wheel worked by such pawl-levers and moving said second pivoted arm, the circuit of the electro-magnets being closed at the moving contacts by the galvanometer-arm, substantially as set forth.

In testimony whereof I have hereunto subscribed my name this 21st day of December, A. D. 1883.

CHARLES L. CLARKE.

Witnesses:
DANL. W. EDGECOMB,
CHARLES A. TERRY.